(12) United States Patent
Mimura et al.

(10) Patent No.: US 8,728,360 B2
(45) Date of Patent: May 20, 2014

(54) APPARATUS AND METHOD FOR PRODUCING OPTICAL SHEETING

(75) Inventors: Ikuo Mimura, Uozu (JP); Chihiro Hayashi, Namekawa (JP); Akihiro Mathuda, Namekawa (JP); Hiroshi Hamada, Namekawa (JP); Naotake Osaki, Namekawa (JP)

(73) Assignee: Nippon Carbide Industries Co., Inc., Tokyo (JP)

(*) Notice: Subject to any disclaimer, the term of this patent is extended or adjusted under 35 U.S.C. 154(b) by 545 days.

(21) Appl. No.: 13/059,498

(22) PCT Filed: Aug. 19, 2009

(86) PCT No.: PCT/JP2009/003958
§ 371 (c)(1),
(2), (4) Date: Jun. 6, 2011

(87) PCT Pub. No.: WO2010/021133
PCT Pub. Date: Feb. 25, 2010

(65) Prior Publication Data
US 2011/0227238 A1 Sep. 22, 2011

(30) Foreign Application Priority Data

| Aug. 20, 2008 | (JP) | 2008-211968 |
| Jun. 4, 2009 | (JP) | 2009-134646 |
| Jul. 21, 2009 | (JP) | 2009-169858 |

(51) Int. Cl.
*B29D 7/01* (2006.01)

(52) U.S. Cl.
USPC ............ 264/1.34; 264/1.6; 264/1.9; 264/175; 425/370; 425/371

(58) Field of Classification Search
CPC .................................................. B29C 35/00
USPC ............ 264/1.34, 1.6, 1.9, 175; 425/370, 371
See application file for complete search history.

(56) References Cited

U.S. PATENT DOCUMENTS

| 4,486,363 A | * | 12/1984 | Pricone et al. | 264/1.36 |
| 4,844,766 A | * | 7/1989 | Held | 156/309.9 |

(Continued)

FOREIGN PATENT DOCUMENTS

| JP | 56-159039 | 12/1981 |
| JP | 56-159127 | 12/1981 |
| JP | 59-140021 | 8/1984 |

(Continued)

*Primary Examiner* — Timothy Kennedy
*Assistant Examiner* — David N Brown, II
(74) *Attorney, Agent, or Firm* — Fitzpatrick, Cella, Harper & Scinto

(57) ABSTRACT

[Object] An apparatus and a method for producing optical sheeting with which increased productivity can be achieved while maintaining the accuracy of produced optical sheeting.
[Solution]
An apparatus 1 for producing optical sheeting includes: a first rotating roll R1 configured to be heated; a second rotating roll R2; a first belt mold S1 that has molds for optical elements on a surface thereof, and is configured to turn around the first rotating roll and the second rotating roll; a sheet feeding means D2 configured to feed synthetic resin sheeting onto a surface of the first belt mold S1, a second belt mold S2 configured to be pressed against the first belt mold S1 and to turn with the turning of the first belt mold S1; and at least two pressure rolls R3 and R5 around which the second belt mold S2 is mounted and which is configured to press the second belt mold S2 against the first belt mold S1, wherein the pressure roll R5 is arranged at a position where the second belt mold S2 comes away from the first belt mold S1 and cooled at a surface thereof.

21 Claims, 9 Drawing Sheets

(56) References Cited

U.S. PATENT DOCUMENTS

| | | | |
|---|---|---|---|
| 5,945,042 A | 8/1999 | Mimura et al. | |
| 6,260,887 B1 * | 7/2001 | Fujii et al. | 264/284 |
| 6,908,295 B2 * | 6/2005 | Thielman et al. | 425/371 |
| 2008/0223510 A1 | 9/2008 | Mizuno et al. | |

FOREIGN PATENT DOCUMENTS

| | | |
|---|---|---|
| JP | 04-062099 | 2/1992 |
| JP | 07-256752 | 10/1995 |
| JP | 3285586 | 5/2002 |
| JP | 2008-260268 | 10/2008 |

* cited by examiner

APPARATUS AND METHOD FOR PRODUCING OPTICAL SHEETING

TECHNICAL FIELD

The present invention relates to an apparatus for producing optical sheeting and a method for producing optical sheeting.

BACKGROUND ART

Optical sheeting formed of resin sheeting having a surface on which an array of micro optical elements that produce various optical effects are formed is used. Examples of such optical elements include cube corner prisms, linear prisms, lenticular lenses, refractive lenses, Fresnel lenses, linear Fresnel lenses, cross prisms, optical elements for holograms and planar optical elements.

In producing the optical sheeting, a highly accurate processing is required unlike common resin processing methods generally applied on surfaces of resin such as embossing, graining and satinizing since the geometric accuracy of the optical elements greatly affects the performance of the optical sheeting.

Patent Document 1 listed below discloses such an apparatus for producing optical sheeting and a method for producing optical sheeting. FIG. 11 is a diagram showing the apparatus for producing optical sheeting disclosed in Patent Document 1.

As shown in FIG. 11, the apparatus for producing optical sheeting includes, as main components: a pair of steel rolls 101 and 102 that rotate in the same direction; a circular belt mold 103 mounted around the pair of steel rolls 101 and 102; an extrusion die 104 that feeds synthetic resin sheeting; a rubber roll 107 that is pressed against the belt mold 103; and a rubber roll 108 that is pressed against the belt mold 103 between a position where the rubber roll 107 is pressed against the belt mold 103 and the steel roll 102.

The steel roll 101 has arranged therein heating means not shown in which heated oil circulates. On the other hand, the steel roll 102 has therein cooling means not shown which is cooled using a cooling medium. The steel rolls 101 and 102 rotate in the same direction at equal surface speeds.

The belt mold 103 mounted around the steel rolls 101 and 102 has a number of molds for an array of optical elements on a surface thereof, and turns unidirectionally around the steel roll 101 and the steel roll 102 with the rotation of the steel rolls 101 and 102. An area in which the belt mold 103 and the steel roll 101 are in contact with each other is a thermoforming zone.

The extrusion die 104 is attached to an extruder and feeds synthetic resin sheeting 105 onto the belt mold 103 at the thermoforming zone.

The rubber roll 107 presses the belt mold 103 in a state where a portion of the belt mold 103 onto which the synthetic resin sheeting 105 is fed from the extrusion die 104 is at the thermoforming zone. The pressing force is caused by a force applied to the rubber roll 107 by a hydraulic cylinder 106. Since the rubber roll 107 presses the belt mold 103 in this manner, the rubber roll 107 rotates at such a speed that the surface speed thereof is equal to the turning speed of the belt mold 103.

The rubber roll 108 is pressed against the belt mold 103 at a portion near an end point of the thermoforming zone by a force applied by an air cylinder 111 through a metallic arm 110 rotatably supported at a supported point thereof. The rubber roll 108 rotates at such a speed that the surface speed thereof is equal to the turning speed of the belt mold 103. Further, the rubber roll 108 is fed with carrier sheeting 109 from an unwinder 112.

A cooler 113 blowing air to the belt mold 103 is arranged between a position at which the belt mold 103 is pressed by the rubber roll 108 and a position at which the belt mold 103 is in contact with the steel roll 102. An area cooled by the cooler 113 and an area where the belt mold 103 and the steel roll 102 are in contact with each other constitute a cooling zone.

An optical device is produced as follows with such an apparatus for producing optical sheeting.

First, the synthetic resin sheeting 105 is continuously extruded through the extrusion die 104 onto the belt mold 103 at the thermoforming zone while the belt mold 103 is turning by the rotation of the steel rolls 101 and 102. The synthetic resin sheeting 105 extruded onto the belt mold 103 is then conveyed by the belt mold 103 to between the rubber roll 107 and the steel roll 101. The synthetic resin sheeting 105 is pressed by the rubber roll 107 and brought into intimate contact with the molds for an array of optical elements formed on the surface of the belt mold 103 to be in engagement with the belt mold 103. An array of optical elements is thus formed on one surface of the synthetic resin sheeting 105.

Then, the synthetic resin sheeting 105 in engagement with the belt mold 103 is moved together with the belt mold 103. Next, the synthetic resin sheeting 105 is moved near the end point of the thermoforming zone, where the synthetic resin sheeting 105 is fed with the carrier sheeting 109 on a surface opposite to the surface facing the belt mold 103 and is pressed by the rubber roll 108. The carrier sheeting 109 is thus laid on the surface of the synthetic resin sheeting 105. The formation of an array of optical elements is thus completed.

Next, the laminate of the synthetic resin sheeting 105 and the carrier sheeting 109 that travels together with the belt mold 105 is moved to the cooling zone, where it is cooled by the cooler 113 and further cooled by the steel roll 102 on the steel roll 102. The synthetic resin sheeting 105 is thus cooled to a temperature equal to or lower than the glass transition temperature of the synthetic resin forming the synthetic resin sheeting 105. The cooled laminate of the synthetic resin sheeting 105 and the carrier sheeting 109 is stripped from the belt mold 103 by means of a stripping roll 114 and wound up as a product (Patent Document 1).

In addition, Patent Document 2 listed below also discloses such an apparatus for producing optical sheeting and a method for producing optical sheeting. FIG. 12 is a diagram showing the apparatus for producing optical sheeting disclosed in Patent Document 2.

As shown in FIG. 12, the apparatus for producing optical sheeting includes, as main components: a pair of steel rolls 250 and 252; a circular belt mold 234 mounted around the steel rolls 250 and 252; a belt 282 configured to be pressed against the belt mold 234; and a plurality of auxiliary rolls 258 configured to press the belt 282 against the belt mold 234.

The belt mold 234 turns around the steel roll 250 and the steel roll 252 by the rotation of the steel rolls 250 and 252 in the same manner as the belt mold 103 disclosed in Patent Document 1 described above. Since the belt 282 is pressed against the belt mold 234 as described above, it turns around the auxiliary rolls 258 with the turning of the belt mold 234.

Sheets of Synthetic resin sheeting 212 and 242 pass between the belt molds 234 and the belt 282 so shat the synthetic resin sheeting 212 and the synthetic resin sheeting 242 are laminated into optical sheeting and engages with the belt mold 234. Subsequently, the optical sheeting is stripped from the belt mold 234 (Patent Document 2).

CITATION LIST

Patent Documents

[Patent Document 1] Japanese Patent No. 3285586
[Patent Document 2] Japanese Patent Application Laid-Open No. 59-140021

SUMMARY OF THE INVENTION

Objects to be Achieved by the Invention

In order to increase the productivity of optical sheeting with the apparatus and the method for producing optical sheeting disclosed in Patent Document 1, it is necessary that an array of optical elements be formed on the surface of the synthetic resin sheeting 105 at a high speed. To this end, it is necessary that the synthetic resin sheeting 105 be pressed against the belt mold 103 in a state where the synthetic resin sheeting 105 is heated to a high temperature and to have a higher flowability.

However, if the synthetic resin sheeting 105 is pressed to the belt mold in the state where the flowability of the synthetic resin sheeting 105 is increased in this manner, the pressed synthetic resin sheeting 105 and the rubber roll 107 may be less strippable from each other. In such case, the synthetic resin sheeting 105 may stretch winding around the rubber roll 107 and the accuracy of transferring the pattern of the optical elements may be lowered.

Similarly, if the productivity of optical sheeting is attempted to be increased with the method for producing optical sheeting disclosed in Patent Document 2, the laminate of the sheets of synthetic resin sheeting 212 and 242 may be less strippable from the belt 282 and the accuracy of transferring the pattern of the optical elements may be lowered in a manner similar to the method for producing optical sheeting of Patent Document 1.

Therefore, an object of the invention is to provide an apparatus for producing optical sheeting and a method for producing optical sheeting with which increased productivity can be achieved while maintaining the accuracy of transferring the pattern of the produced optical elements.

Means for Achieving the Objects

An apparatus for producing optical sheeting according to the invention includes: a first rotating roll configured to be heated; a second rotating roll; a first belt mold that has molds for optical elements on a surface thereof, is mounted around the first rotating roll and the second rotating roll, and is configured to turn around the first rotating roll and the second rotating roll with rotation of the first rotating roll and the second rotating roll; sheet feeding means configured to feed synthetic resin sheeting onto a surface of the first belt mold; a second belt mold that has molds for optical elements on a surface thereof, and is configured to be pressed against the first belt mold at a portion of an area where the first rotating roll and the first belt mold are in contact with each other and to turn with the turning of the first belt mold; and at least two pressure rolls around which the second belt mold is mounted and which is configured to press the second belt mold against the first belt mold, wherein one of the pressure rolls is arranged at a position where the second belt mold comes away from the first belt mold and is configured to be cooled at a surface thereof, and the second belt mold is cooled at a portion where the second belt mold comes away from the first belt mold.

According to such an apparatus for producing optical sheeting, the first belt mold turning around the first rotating roll and the second rotating roll R2 is heated at the area where the first belt mold is in contact with the first rotating roll by the heat transferred from the first rotating roll. The second belt mold is pressed against the first belt mold by at least two pressure rolls at a portion of the area where the first belt mold is in contact with the first rotating roll. When synthetic resin sheeting is fed from the sheet feeding means onto the surface of the first belt mold, the fed synthetic resin sheeting is softened by the heat of the first belt mold. The softened synthetic resin sheeting is pressed against the first belt mold by the pressing force from the second belt mold, and the optical elements are formed on the surface of the synthetic resin sheeting by the molds for the optical elements formed on the surfaces of the first belt mold and the second belt mold.

One of the pressure rolls that press the second belt mold against the first belt mold is arranged at a position where the second belt mold comes away from the first belt mold, and cooled at the surface thereof. Therefore, the second belt mold is cooled by this pressure roll around the position where the second belt mold comes away from the first belt mold. Since the second belt mold is cooled before a position where the second belt mold comes away from the first belt mold in this manner, the synthetic resin sheeting between the second belt mold and the first belt mold is cooled at least at the surface facing the second belt mold before a position where the second belt mold comes away from the first belt mold. Since the synthetic resin sheeting having the optical elements formed on the surface thereof is cooled at least at the surface facing the second belt mold, the synthetic resin sheeting is prevented from becoming difficult to strip from the second belt mold at a position where the second belt mold comes away from the first belt mold even if the temperature of the first rotating roll is raised and the turning speed of the first belt mold is increased so as to increase productivity of the optical sheeting. Thus, the synthetic resin sheeting is prevented from stretching, and the accuracy of transferring the pattern of the optical elements can be maintained even if the productivity is increased.

In the apparatus for producing optical sheeting, it is preferable that a surface of the second rotating roll is cooled, and the first belt mold is cooled at a portion where the first belt mold is in contact with the second rotating roll.

According to such an apparatus for producing optical sheeting, the first belt mold near the second rotating roll is cooled by the cooled second rotating roll. Therefore, the synthetic resin sheeting is further cooled around the second rotating roll, and the synthetic resin sheeting is prevented from stretching when the synthetic resin sheeting is stripped from the first belt mold. The accuracy of transferring the pattern of the optical elements can therefore be more securely maintained.

In the apparatus for producing optical sheeting, it is preferable that at least one of the pressure rolls other than the pressure roll that is cooled at the surface thereof is heated at a surface thereof, one of the pressure rolls that are heated at the surface thereof is arranged at a position where the first belt mold and the second belt mold come close to each other, and the second belt mold is heated at least at a portion where the second belt mold comes close to the first belt mold.

According to such an apparatus for producing optical sheeting, at least one of the pressure rolls other than the pressure roll that is cooled at the surface thereof is heated, and one of the heated pressure roll is arranged at a position where the first belt mold and the second belt mold come close to each other. Then, the second belt mold is heated at least at a portion that comes close to the first belt mold. Since the thus heated second belt mold is pressed against the first belt mold, the temperature of the first belt mold can be prevented from being unnecessarily lowered. Therefore, the synthetic resin sheeting can be properly heated.

In the apparatus for producing optical sheeting, it is preferable that the sheet feeding means is configured to feed the synthetic resin sheeting onto the surface of the first belt mold through the surface of the second belt mold that is heated by the pressure roll.

According to such an apparatus for producing optical sheeting, the synthetic resin sheeting is fed onto a portion of the second belt mold on the heated pressure roll, and accordingly, the temperature of the synthetic resin sheeting can be raised by the time when the synthetic resin sheeting is pressed against the first belt mold, and the preset temperature of the first rotating roll can be lowered. As a result, the durability of the second belt mold and the first belt mold can be increased. Moreover, since the temperature of the synthetic resin sheeting can be raised by the time when the synthetic resin sheeting is pressed against the first belt mold and the second belt mold, the processing speed can be increased and the productivity can be further increased.

In the apparatus for producing optical sheeting, it is preferable that the sheet feeding means is configured to feed the synthetic resin sheeting directly onto the surface of the first belt mold at an area where the first belt mold and the first rotating roll are in contact with each other.

According to such an apparatus for producing optical sheeting, the synthetic resin sheeting is fed onto a heated portion of the first belt mold, and accordingly, the temperature of the synthetic resin sheeting can be raised by the time when the synthetic resin sheeting is pressed against the first belt mold and the second belt mold, the processing speed can be increased and thus the productivity can be further increased.

In the apparatus for producing optical sheeting, it is preferable that the sheet feeding means is configured to feed the synthetic resin sheeting in a softened state.

According to such an apparatus for producing optical sheeting, since the synthetic resin sheeting is fed in a softened state, the preset temperature of the first rotating roll and the heated pressure roll can be lowered. As a result, the durability of the second belt mold and the first belt mold can be increased. Moreover, since the synthetic resin sheeting can be fed in a softened state, the processing speed can be increased and the productivity can be further increased.

In the apparatus for producing optical sheeting, it is preferable that at least two sheets of synthetic resin sheeting are fed from the sheet feeding means, and it is further preferable that three or more sheets of synthetic resin sheeting are fed therefrom.

According to such an apparatus for producing optical sheeting, a laminate of a plurality of sheets of synthetic resin sheeting can be used for optical sheeting. Thus, by heat-sealing a plurality of synthetic resins firmly, deformation and warpage, which may appear when sheets of synthetic resin sheeting are bonded using an adhesive, can be prevented. Moreover, the thickness of the optical sheeting can be increased.

Further, in the apparatus for producing optical sheeting, the synthetic resin sheeting between other sheets of synthetic resin sheeting may be sheeting that changes an optical property.

The apparatus for producing optical sheeting further includes film laminating means configured to laminate a surface opposite to a surface facing the first belt mold of the synthetic resin sheeting with a film after the second belt mold comes away from the first belt mold.

According to such an apparatus for producing optical sheeting, lamination of the film such as a protective film or a carrier film allows optical sheeting to be protected from being marred on a formed surface during processing of the optical sheeting after being cut or printed thereon. The optical sheeting is also prevented from being deformed which may occur when a soft resin is used.

A method for producing optical sheeting according to the invention includes: an apparatus operating process of turning a first belt mold having a surface in which molds for optical elements are formed while heating a predetermined area of the turning first belt mold, and turning a second belt mold with the turning of the first belt mold while pressing the second belt mold, which has a surface in which molds for optical elements are formed, against a portion of the predetermined area of the first belt mold and cooling a portion of the second belt mold where the second belt mold comes away from the first belt mold; a feeding process of feeding synthetic resin sheeting onto a surface of the predetermined area of the first belt mold; a softening process of softening the synthetic resin sheeting by the heat of the first belt mold; a forming process of pressing the synthetic resin sheeting in intimate contact with surfaces of the first belt mold and the second belt mold by a pressing force from the second belt mold to form the optical elements on a surface of the synthetic resin sheeting; a cooling process of cooling at least the surface of the synthetic resin sheeting on the side of the second belt mold, by cooling the second belt mold in a state where the synthetic resin sheeting on which the optical elements are formed is pressed against the first belt mold; and a stripping process of stripping the cooled synthetic resin sheeting from the second belt mold.

According to such a method for producing optical sheeting, the synthetic resin sheeting fed between the first belt mold and the second belt mold that turn respectively is softened by the heat of the first belt mold and further pressed by the first belt mold and the second belt mold, and thus optical elements are formed on the surface of the synthetic resin sheeting. The surface facing the second belt mold of the synthetic resin sheeting having optical elements formed thereon is cooled by the cooled portion of the second belt mold. Then, the cooled synthetic resin sheeting is stripped from the second belt mold. Since the synthetic resin sheeting having the optical elements formed on the surface thereof is cooled at least at the surface facing the second belt mold before being stripped from the second belt mold, the synthetic resin sheeting is prevented from becoming difficult to strip from the second belt mold even if the temperature of the first rotating roll is raised and the turning speed of the first belt mold is increased so as to increase productivity of the optical sheeting. Thus, the synthetic resin sheeting A is prevented from stretching, and the accuracy of transferring the pattern of the optical elements can be maintained even if the productivity is increased.

In the apparatus operating process of the method for producing optical sheeting, it is preferable that another predetermined area different from the predetermined area of the first belt mold is cooled, and that the method further comprises a second cooling process of cooling the synthetic resin sheeting by the cooled first belt mold after the stripping process.

According to such a method for producing optical sheeting, since another predetermined area different from the predetermined area of the first belt mold is cooled, the synthetic resin sheeting is further cooled at the cooled area, and thus, the synthetic resin sheeting can be prevented from stretching when the synthetic resin sheeting is stripped from the first belt mold. The accuracy of transferring the pattern of the optical elements can therefore be more securely maintained.

In the apparatus operating process of the method for producing optical sheeting, it is preferable that a portion of the second belt mold where the first belt mold and the second belt mold come close to each other is heated.

According to such an apparatus for producing optical sheeting, since the heated second belt mold is pressed against the first belt mold, the temperature of the first belt mold can be prevented from being unnecessarily lowered. Therefore, the synthetic resin sheeting can be properly heated.

In the feeding process of the method for producing optical sheeting, it is preferable that the synthetic resin sheeting is fed onto the surface of the first belt mold through the heated second belt mold.

According to such a method for producing optical sheeting, since the synthetic resin sheeting is fed onto the heated second belt mold, the time taken for the softening process before entering the forming process can be lengthened, and as a result, the durability of the second belt mold and the first belt mold can be increased. Moreover, the formability of the synthetic resin can be increased by raising the temperature of the synthetic resin. Therefore, the processing speed can be increased and the productivity can be further increased.

In the feeding process of the method for producing optical sheeting, it is preferable that the synthetic resin sheeting is directly fed onto the surface of the predetermined area of the first belt mold.

According to such a method for producing optical sheeting, the time taken for the softening process before entering the forming process can be lengthened, and as a result, the durability of the second belt mold and the first belt mold can be increased. Moreover, when the time taken for the softening process before entering the forming process is lengthened, the processing speed can be increased and thus the productivity can be increased.

In the feeding process of the method for producing optical sheeting, it is preferable that the synthetic resin sheeting is fed in a softened state.

According to such a method for producing optical sheeting, since the synthetic resin sheeting is fed in a softened state, the processing speed can be increased and the productivity can be further increased.

In the feeding process of the method for producing optical sheeting, it is preferable that at least two sheets of the synthetic resin sheeting are fed together so that the sheets are laid on each other, and it is more preferable that three or more sheets of the synthetic resin sheeting are fed together so that the sheets are laid on each other.

According to such a method for producing optical sheeting, by heat-sealing a plurality of synthetic resins firmly, deformation and warpage, which may appear when sheets of synthetic resin sheeting are bonded using an adhesive, can be prevented. Moreover, the thickness of the optical sheeting can be increased.

Further, in the method for producing optical sheeting, the synthetic resin sheeting between other sheets of synthetic resin sheeting may be sheeting that changes an optical property.

In addition, at least one sheet of the synthetic resin sheeting may be made of multilayer synthetic resin.

In the softening process of the method for producing optical sheeting, it is preferable that a viscosity of the softened synthetic resin sheeting is 10,000 PaS or less.

According to such a method for producing optical sheeting, since the synthetic resin sheeting has high flowability, it has higher moldability, the thickness and the irregularity of produced optical sheeting can be reduced, and the accuracy of the optical sheeting can be maintained. Furthermore, since the pressing force in the forming process can be reduced, the forming accuracy of the accuracy of forming the optical elements can be improved.

The method for producing optical sheeting preferably further includes: a film laminating process of laminating a surface opposite to a surface facing the first belt mold of the synthetic resin sheeting with a film after the stripping step.

According to such a method for producing optical sheeting, the optical sheeting can be laminated with a film that changes optical properties such as color phase, light diffusion properties and transparency and the thickness of the optical sheeting can be increased.

In the method for producing optical sheeting, the synthetic resin sheeting includes synthetic resin that may be at least one of acrylic resin, polyester resin, polycarbonate resin, vinyl chloride resin, polystyrene resin, polyolefin resin, fluorine containing resin, cyclic olefin resin, silicone resin and polyurethane resin.

In addition, the optical elements may be any of cube corner prisms, linear prisms, lenticular lenses, refractive lenses, Fresnel lenses, linear Fresnel lenses, cross prisms, optical elements for holograms, and planar optical elements.

Effect of the Invention

According to the invention, an apparatus for producing optical sheeting and a method for producing optical sheeting with which increased productivity can be achieved while maintaining the accuracy of transferring the pattern of optical elements of optical sheeting to be produced.

BEST MODE FOR CARRYING OUT THE INVENTION

Figure 1:
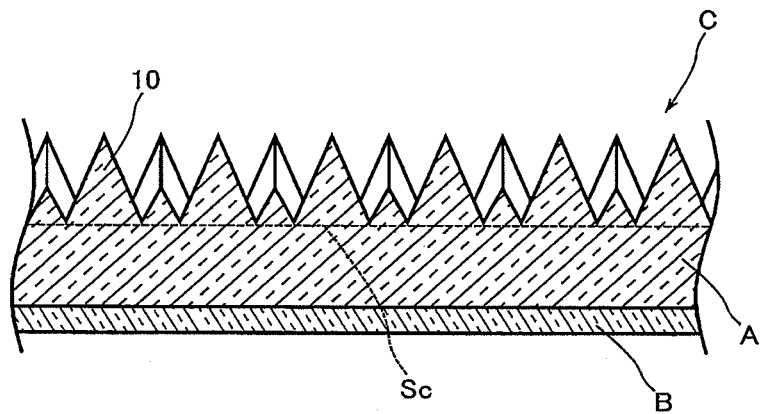
FIG. 1 is a sectional view showing an example of optical sheeting produced according to a method for producing optical sheeting according to a first embodiment of the invention.

Preferred embodiments of an apparatus for producing optical sheeting and a method for producing optical sheeting according to the invention will be explained hereinafter referring to the drawings.

(First Embodiment)

FIG. 1 is a sectional view showing an example of optical sheeting produced according to a method for producing optical sheeting according to a first embodiment of the invention.

As shown in FIG. 1, optical sheeting C in this embodiment is cube corner prism reflective sheeting. The cube corner prism reflective sheeting as the optical sheeting C is formed of synthetic resin sheeting A and a film B as shown in FIG. 1. However, the film B may be omitted.

The synthetic resin sheeting A is made of transparent resin and has a number of optical elements 10 formed on one surface thereof. The optical elements 10 are cube corner prisms and each have a triangular pyramidal shape. One surface of each triangular pyramid is arranged on a common plane Sc shown by a dashed line in FIG. 1. The cube corner prisms as the optical elements 10 exhibit retroreflectivity that reflect light incident on the film B back in the direction opposite to the incident direction. With a set of a number of such optical elements 10, the synthetic resin sheeting A exhibits retroreflectivity. The set of a number of optical elements 10 forms a micro-structure array. The height (the height measured from the common plane Sc) of the optical elements 10 is not particularly limited, but is preferably 0.5 µm to 200 µm, and more preferably 7 µm to 70 µm, so as to obtain excellent optical properties.

The resin for the synthetic resin sheeting A is not particularly limited as long as it has high transparency. Examples of the resin includes acrylic resin, polyester resin, polycarbonate resin, vinyl chloride resin, polystyrene resin, polyolefin resin, fluorine containing resin, cyclic olefin resin, silicone resin and polyurethane resin, or a combination thereof. Among the examples, acrylic resin, polycarbonate resin, vinyl chloride resin and polyurethane resin are preferable in terms of weather resistance, transparency and the like.

The film B is made of transparent resin, and is a protective film that protects a surface of the synthetic resin sheeting A opposite to the surface on which the optical elements 10 are formed, for example. The thickness of the film B is not preferably limited, but is preferably 5 µm to 750 µm, and more preferably 50 µm to 500 µm. Such a thickness range is preferable since it is possible to prevent the optical elements from being marred and prevent wrinkles appearing in the film B and the film B has such high handleability that it can be easily stripped from the synthetic resin sheeting A as necessary.

Figure 2:
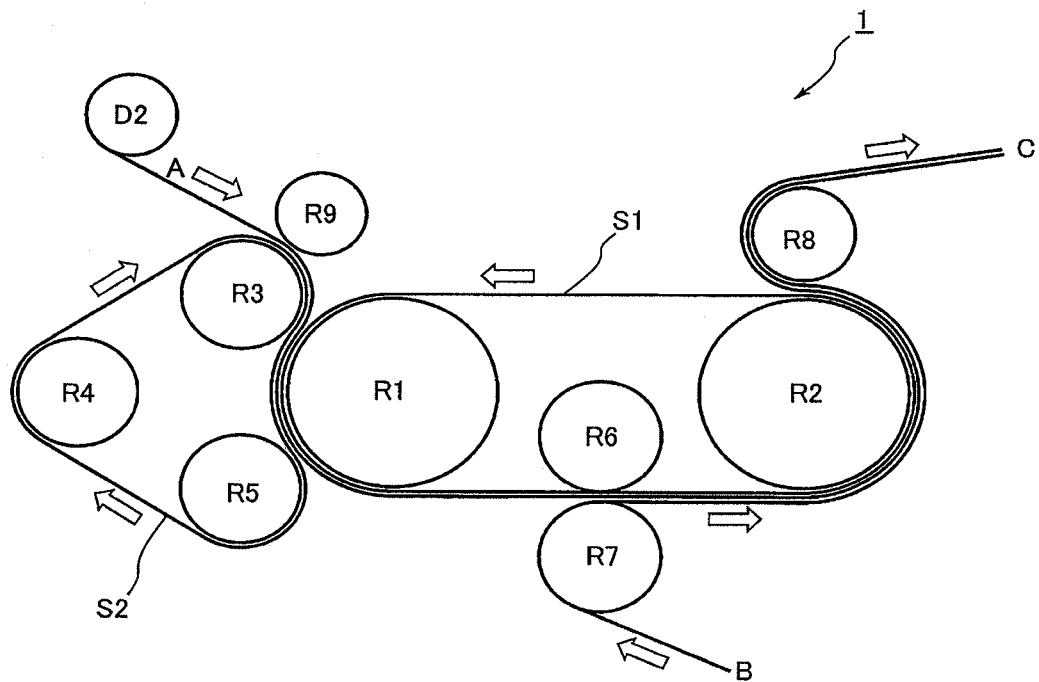
FIG. 2 is a diagram showing an apparatus for producing the optical sheeting shown in FIG. 1.

FIG. 2 is a diagram showing an apparatus 1 for producing the optical sheeting C shown in FIG. 1.

As shown in FIG. 2, the production apparatus 1 includes, as main components: a first rotating roll R1; a second rotating roll R2; a first belt mold S1 mounted around the first rotating roll R1 and the second rotating roll R2; a reel D2 that is sheet feeding means configured to feed the synthetic resin sheeting A; a second belt mold S2 that is pressed against the first belt mold S1 at a portion of an area where the first rotating roll R1 and the first belt mold S1 are in contact with each other; a plurality of pressure rolls R3 and R5 and a tension roll R4 around which the second belt mold S2 is mounted; and laminating pressure rolls R6 and R7 configured to laminate with a film a surface of the synthetic resin sheeting A opposite to the side facing the belt mold S1.

The first rotating roll R1 has a substantially cylindrical shape and configured to rotate around its axis.

In addition, the surface of the first rotating roll R1 is adapted to be heated. The heating is carried out by an internal heating method of heating from inside of the first rotating roll R1 or an external heating method of heating from outside of the first rotating roll R1, for example. When the internal heating method is employed, heat generating means not shown that produces heat by means of a dielectric heating system, a heating medium circulating system or the like is arranged inside of the first rotating roll R1. Heating means for the external heating method, on the other hand, may be indirect heating means such as a hot blast heater, a near-infrared lamp heater and a far-infrared lamp heater. Alternatively, the external heating method may be supplementarily used when the first rotating roll R1 is heated by the internal heating method. The temperature of the heated surface of the first rotating roll R1 is suitably determined depending on the type of the synthetic resin sheeting A and is not particularly limited, but may be 100° C. to 300° C., for example.

The second rotating roll R2 has a substantially cylindrical shape and configured to rotate around its axis. The second rotating roll R2 is configured to rotate at a peripheral speed of the surface thereof equal to the surface speed of the first rotating roll R1.

In addition, the surface of the second rotating roll R2 is adapted to be cooled. The cooling is carried out by an internal cooling method of cooling from inside of the second rotating roll R2, for example. Cooling means that cools inside of the second rotating roll R2 may be circulating cooling means configured to cool by circulating a cooling medium such as water inside the second rotating roll R2.

The first belt mold S1 is mounted around such a pair of first and second rotating rolls R1 and R2, one of which is heated and the other of which is cooled, as described above. The belt mold S1 thus turns around the first and second rotating rolls R1 and R2 in a predetermined turning direction with the rotation of the first and second rolls R1 and R2. The thickness of the first belt mold S1 is not particularly limited, but is preferably 1/3000 to 1/500 of the diameter of the first rotating roll R1, and particularly preferably 1/1200 to 1/800 thereof.

Further, since the first belt mold S1 is mounted around the first rotating roll R1, an area of the first belt mold S1 that is in contact with the first rotating roll R1 is heated by the first rotating roll R1. In this state, the temperature of the surface of the first belt mold S1 at the area where the first belt mold S1 is in contact with the first rotating roll R1 is higher than a flow initiation temperature of the synthetic resin sheeting A. The flow initiation temperature is a temperature at which the synthetic resin sheeting A is softened to flow to an extent that it can be press-molded as a result of being heated to a glass transition temperature or higher. Specifically, the flow initiation temperature is preferably a temperature lower than the decomposition temperature of the synthetic resin sheeting A and at which the synthetic resin sheeting flows and has a viscosity of 10,000 PaS (100,000 poises) or lower in terms of the effects that the synthetic resin has high moldability as it has high flowability, the thickness and the irregularity of produced optical sheeting C can be reduced and the accuracy of the optical sheeting C can be maintained. Further, such a flow initiation temperature is preferable in terms of the effect that the second belt mold and the first belt mold can have higher durability since the pressing force applied in forming the optical sheeting can be decreased.

A number of molds for the optical elements 10 to be formed on the synthetic resin sheeting A are continuously formed on a surface of the first belt mold S1 opposite to the side facing the first and second rotating rolls R1 and R2. A method of forming the array of the molds for the optical elements 10 on one surface of the first belt mold S1 is as follows. First, a matrix in which the molds are to be formed is prepared. The matrix is formed, for example, by a method of cutting grooves in a surface of a metal for the matrix in a plurality of directions by means of flycutting, ruling, diamond turning or the like to form a pattern of the shape of the optical elements. The thus formed pattern of the shape of the optical elements in the matrix is transferred to the first belt mold. The molds for the optical elements are thus formed on a surface of the first belt mold.

The arrangements of the pressure rolls R3 and R5 and the tension roll R4 around which the second belt mold S2 is mounted are such that the pressure roll R3 is arranged at a position where the second belt mold S2 and the first belt mold S1 come close to each other, the pressure roll R5 is arranged at a position where the second belt mold S2 comes away from the first belt mold S1, and the pressure roll R4 is arranged at a position away from the first rotating roll R1 along a direction perpendicular to a line connecting the pressure rolls R3 and R5. The pressure rolls R3 and R5 are pressed against the second belt mold S2 by a hydraulic cylinder not shown so that the second belt mold S2 is pressed against the first belt mold S1. A force is applied to the tension roll R4 by a hydraulic cylinder not shown to stretch the second belt mold S2, and the tension roll R4 thus applies tension to the second belt mold S2.

The surface of the pressure roll R3 arranged at a position where the second belt mold S2 and the first belt mold S1 come close to each other is heated by the same method as that for heating the surface of the first rotating roll R1. The temperature of the surface of the pressure roll R3 can be appropriately selected based on the flow initiation temperature depending on the type of the synthetic resin sheeting A, the thickness of the synthetic resin sheeting A, the shape of the optical elements 10 and the molded state of the optical elements 10. The temperature of the surface of the pressure roll R3 may be substantially equal to that of the first rotating roll R1 or may be different from that of the first rotating roll R1.

The surface of the pressure roll R5 arranged at a position where the second belt mold S2 comes away from the first belt mold S1 is cooled by the same method as that for cooling the surface of the second rotating roll R2.

The surface of the second belt mold S2, which is mounted around such pressure rolls R3 and R5 and tension roll R4, on the side coming in contact with the synthetic resin sheeting A has formed therein the molds for optical elements that have flat surface without irregularities. Thus, the surface of the second belt mold S2 on the side coming in contact with the synthetic resin sheeting A has a flat shape without irregularities. Herein, a flat surface refers to a surface having an average surface roughness Ra of 50 nm or less.

The flat surface is pressed against the first belt mold S1 by the pressure rolls R3 and R5 at a portion of the area where the first rotating roll R1 and the first belt mold S1 are in contact with each other. Therefore, the second belt mold S2 turns around the pressure rolls R3 and R5 and the tension roll R4 at a peripheral speed equal to that at which the first belt mold S1 turns around the first and second rotating roll R1 and R2.

The surface of the second belt mold S2 on the side opposite to the surface in contact with the pressure roll R3 is pressed by a rubber roll R9. The synthetic resin sheeting A is fed between the roll R9 and the second belt mold S2 by the reel D2 that is sheet feeding means. In this embodiment, the sheet feeding means is constituted by the reel D2 around which the synthetic resin sheeting A is wound. The synthetic resin sheeting A fed by the reel D2 is in a solid state.

The first belt mold S1 is pressed between the pair of laminating pressure rolls R6 and R7 that are film laminating means at a position forward in the traveling direction of the first belt mold S1 from the position where the second belt mold S2 comes away from the first belt mold S1. Specifically, the surface of the first belt mold S1 in which the molds for the optical elements are formed is pressed by the laminating pressure roll R7 and the surface opposite thereto is pressed by the laminating pressure roll R6. The film B is fed onto the laminating pressure roll R7.

Further, the first belt mold S1 comes in contact with the second rotating roll R2 described above at a position forward in the traveling direction of the first belt mold S1 from the position where it is pressed between the laminating pressure rolls R6 and R7. In addition, a stripping roll R8 is provided at the position where the first belt mold S1 comes away from the rotating roll R2 on the side opposite to the second rotating roll R2 with respect to the first belt mold.

Next, a method for producing optical sheeting with such an apparatus for producing optical sheeting will be described.

Figure 3:
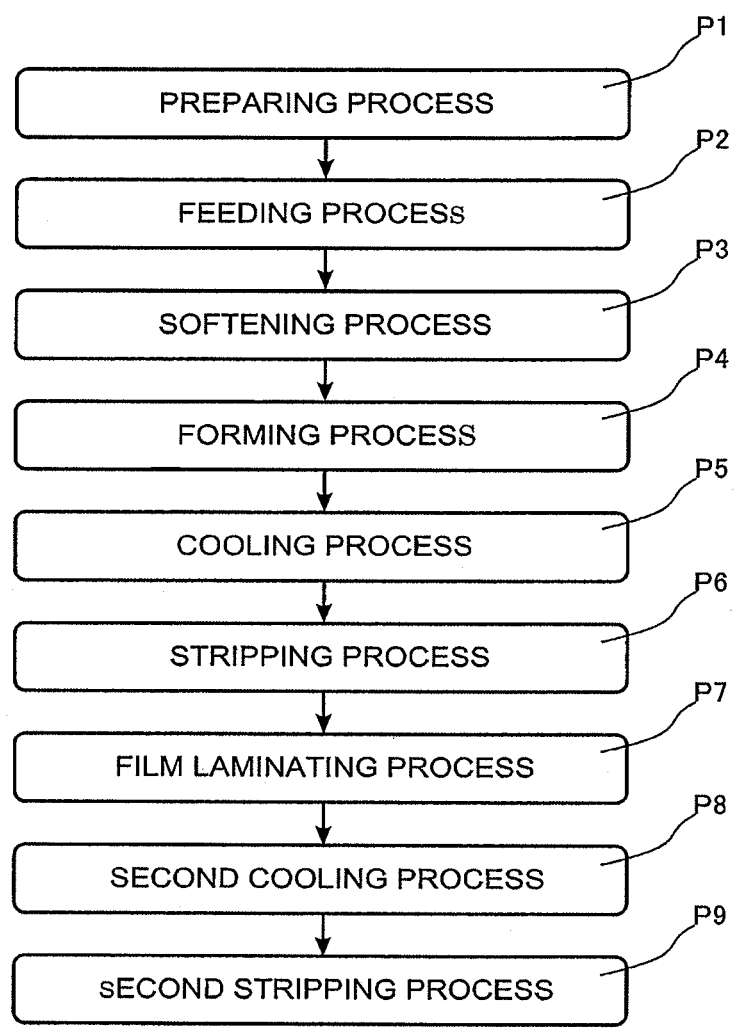
FIG. 3 is a flowchart of a method for producing the optical sheeting shown in FIG. 1.

FIG. 3 is a flowchart of a method for producing the optical sheeting shown in FIG. 1. As shown in FIG. 3, the method for producing optical sheeting according to this embodiment includes as main processes: an apparatus operating process P1 of turning the first belt mold S1 having the surface in which the molds for the optical elements are formed while heating a predetermined area of the turning first belt mold S1, and turning the second belt mold S2 with the turning of the first belt mold S1 while pressing the second belt mold S2 against a portion of the predetermined area of the first belt mold S1 and cooling a portion of the second belt mold S2 where the second belt mold S2 comes away from the first belt mold S1; a feeding process P2 of feeding the synthetic resin sheeting on a surface of the first belt mold S1; a softening process P3 of softening the synthetic resin sheeting A by the heat of the second belt mold S2; a forming process P4 of pressing the synthetic resin sheeting A in intimate contact with the surfaces of the first belt mold S1 and the second belt mold S2 by the pressing force from the second belt mold S2 to form the optical elements 10 on the surface of the synthetic resin sheeting A; a cooling process P5 of cooling the synthetic resin sheeting A by cooling the second belt mold S2 in a state where the synthetic resin sheeting A on which the optical elements 10 are formed is pressed against the first belt mold S1; a stripping process P6 of stripping the cooled synthetic resin sheeting A from the second belt mold S2; a film laminating process P7 of laminating the surface of the synthetic resin sheeting A opposite to the surface facing the first belt mold S1 with the film B after the stripping process P6; a second cooling process P8 of cooling the synthetic resin sheeting A by cooling another predetermined area of the first belt mold S1 different from the predetermined area; and a second stripping process P9 of stripping the synthetic resin sheeting A from the first belt mold S1. In this embodiment, some of the processes may be performed simultaneously.

(Apparatus Operating Process P1)

First, the first and second rotating rolls R1 and R2 shown in FIG. 2 are rotated. The rotation of the first and second rotating rolls R1 and R2 causes the first belt mold S1 to turn around the first and second rotating rolls R1 and R2 in a given direction.

In this process, the surface of the first rotating roll R1 is heated by the heating method described above. As the surface of the first rotating roll R1 is thus heated, an area of the first belt mold S1 in contact with the first rotating roll R1 is heated. This area is referred to as the predetermined area. The first belt mold S1 thus heated remains in the heated state for a while after separating from the first rotating roll R1. The duration of the heated state of the first belt mold S1 is preferably set to such an extent that the surface of the synthetic resin sheeting A is solidified at a position where it is pressed by the laminating pressure rolls R6 and R7.

The second rotating roll R2 is cooled by the cooling method described above while the first and the second rotating rolls R1 and R2 rotates.

Further, the second belt mold S2 is pressed against the first belt mold S1 by the pressure rolls R3 and R5 at a portion of the predetermined area where the first belt mold S1 is in contact with the first rotating roll R1. The second belt mold S2 thus turns with the turning of the first belt mold S1.

In this process, the pressure roll R5 arranged at a position where the second belt mold S2 comes away from the first belt mold S1 is cooled as described above. Thus, the portion of the second belt mold S2 where the second belt mold S2 comes away from the first belt mold S1 is cooled.

In addition, the pressure roll R3 arranged at a position where the second belt mold S2 comes close to the first belt mold S1 is heated as described above. Thus, the portion of the second belt mold S2 coming close to the first belt mold S1 is heated.

As described above, the second belt mold S2 comes close to the first belt mold S1 and pressed thereagainst in the heated state, and comes away from the first belt mold S1 in the cooled state.

(Feeding Process P2)

As the first belt mold S1 and the second belt mold S2 turn in the apparatus operating process P1, the synthetic resin sheeting A is fed from the reel D2 that is sheet feeding means shown in FIG. 2 onto the surface of the second belt mold S2 at a position where the second belt mold S2 is in contact with the pressure roll R3. Since the pressure roll R3 is heated as described above, an area of the surface of the second belt mold S2 where the second belt mold S2 is in contact with the pressure roll R3 is heated. Thus, the synthetic resin sheeting A is fed onto the heated area of the second belt mold S2.

In this process, the synthetic resin sheeting A is pressed by the roll R9 before being fed as described above, which prevents wrinkles from appearing and air bubbles or the like from being contained in the synthetic resin sheeting A.

The synthetic resin sheeting A thus fed onto the surface of the second belt mold S2 travels with the turning of the second belt mold S2 and passes between the second belt mold S2 and the first belt mold S1. The synthetic resin sheeting A is thus fed onto the first belt mold S1.

The thickness of the synthetic resin sheeting A is not particularly limited, but is preferably 5 to 750 μm, and more preferably 50 to 500 μm, so as to facilitate formation of the optical elements 10 shown in FIG. 1.

(Softening Process P3)

Next, the synthetic resin sheeting A fed onto the first belt mold S1 is heated by the heat of the first belt mold S1. The temperature of the synthetic resin sheeting A in this state is the flow initiation temperature of the synthetic resin sheeting A or higher. As a result, the synthetic resin sheeting A is softened. The viscosity of the synthetic resin sheeting A in this state is preferably 10,000 PaS (100,000 poises) or lower, and more preferably 5,000 PaS (50,000 poises) or lower.

(Forming Process P4)

Next, the synthetic resin sheeting A softened by being heated by the first belt mold S1 is pressed in intimate contact with the surface of the first belt mold S1 by the pressing force from the second belt mold S2. The pressing force from the second belt mold S2 is dependent on the type of the synthetic resin of synthetic resin sheeting A, the shape of the first belt mold S1 and the like. The pressing force is not particularly limited but is preferably 5 to 100 kg/cm, and more preferably 20 to 80 kg/cm with respect to the width of the synthetic resin sheeting A. The turning speed of the first belt mold S1 is not particularly limited but is preferably 1 to 20 m/min, and more preferably 2 to 10 m/min, as a speed for feeding and press molding the synthetic resin sheeting A. The optical elements 10 are formed on the surface of the synthetic resin sheeting A thus pressed in intimate contact with the surface of the first belt mold S1 by means of the molds for the optical elements 10 formed in the surface of the first belt mold S1.

(Cooling Process P5)

Next, the synthetic resin sheeting A on the surface of which the optical elements 10 are formed in the forming process P4 travels with the turning of the first belt mold S1 and the second belt mold S2 in a state pressed by the second belt mold S2 against the first belt mold S1. Then, the synthetic resin sheeting A approaches the position where the first belt mold S1 and the second belt mold S2 come away from each other. At this point, the second belt mold S2 is cooled by the cooled pressure roll R5 as described above. The surface facing the second belt mold of the synthetic resin sheeting A pressed against the second belt mold S2 is thus cooled by the cooled second belt mold S2. The temperature of the synthetic resin sheeting A in this state may be equal to or higher or lower than the glass transition temperature.

(Stripping Process P6)

Next, the synthetic resin sheeting A, at least the surface of which facing the second belt mold is cooled, travels further with the rotation of the first belt mold S1 and the second belt mold S2 in a state pressed by the second belt mold S2 in intimate contact with the first belt mold S1. Next, the second belt mold S2 changes its direction along the pressure roll R5 and comes away from the first belt mold S1. At this point, the synthetic resin sheeting A that is in close contact with the surface of the first belt mold S1 is stripped from the second belt mold S2.

(Film Laminating Process P7)

The synthetic resin sheeting A thus stripped from the second belt mold S2 travels together with the first belt mold S1 with the turning of the first belt mold S1. Then, the first belt mold S1 and the synthetic resin sheeting A are pressed by the laminating pressure rolls R6 and R7 that are film laminating means. The synthetic resin sheeting A at this point is in a solidified state. The surface of the first belt mold S1 opposite to the side in close contact with the synthetic resin sheeting A is pressed by the laminating pressure roll R6, and the synthetic resin sheeting A is pressed by the laminating pressure roll R7. At this point, the film B is fed by the laminating pressure roll R7. Since the synthetic resin sheeting A is pressed by the laminating pressure roll R7 while the film B is fed from the laminating pressure roll R7 in this manner, the surface of the synthetic resin sheeting A opposite to the surface on which the optical elements 10 are formed is laminated with the film B, and the optical sheeting C is thus obtained.

(Second Cooling Process P8)

After the lamination of the film B, the optical sheeting C turns together with the first belt mold S1. The first belt mold S1 then comes in contact with the second rotating roll R2. Since the second belt mold R2 is cooled as described above, the first belt mold S1 is cooled by the cooled second rotating roll R2. Further, the synthetic resin sheeting A is cooled by the cooled first belt mold S1.

(Second Stripping Process P9)

Next, the synthetic resin sheeting A cooled by the second rotating roll R2 changes its direction along the surface of the stripping roll R8. The optical sheeting C is thus stripped from the first belt mold S1 by the stripping roll R8 and wound up by a reel not shown. The optical sheeting C shown in FIG. 1 is thus obtained.

According to the apparatus 1 for producing optical sheeting and the method for producing optical sheeting according to this embodiment, the first belt mold S1 turning around the first rotating roll R1 and the second rotating roll R2 is heated at the predetermined area in contact with the first rotating roll R1 by the heat transferred from the first rotating roll R1. At the predetermined area where the first belt mold S1 is in contact with the first rotating roll R1, the second belt mold S2 is pressed against the first belt mold S1 by a plurality of pressure rolls R3 and R5. When the synthetic resin sheeting A is fed onto the surface of the first belt mold S1 from the reel D2, the fed synthetic resin sheeting A is softened by the heat of the first belt mold S1. The softened synthetic resin sheeting A is pressed against the first belt mold S1 by the pressing force from the second belt mold S2, and the optical elements 10 are formed on the surface of the synthetic resin sheeting A by the molds for the optical elements formed in the surface of the first belt mold S1.

One pressure roll R5 of the pressure rolls R3 and R5 that press the second belt mold S2 against the first belt mold S1 is arranged at a position where the second belt mold S2 comes away from the first belt mold S1, and the surface of the one pressure roll R5 is cooled. Therefore, the second belt mold S2 is cooled by the pressure roll R5 around the position where the second belt mold S2 comes away from the first belt mold S1. Since the second belt mold S2 is cooled before a position where the second belt mold S2 comes away from the first belt mold S1 in this manner, the synthetic resin sheeting A between the second belt mold S2 and the first belt mold S1 is cooled at least at the surface facing the second belt mold S2 before a position where the second belt mold S2 comes away from the first belt mold S1. Since the synthetic resin sheeting A having the optical elements 10 formed on the surface thereof is cooled at least at the surface facing the second belt mold, the synthetic resin sheeting A is prevented from becoming difficult to strip from the second belt mold S2 at a position where the second belt mold S2 comes away from the first belt mold S1 even if the temperature of the first rotating roll R1 is raised and the turning speed of the first belt mold S1 is increased so as to increase productivity of the optical sheeting. Thus, the synthetic resin sheeting A is prevented from stretching, and the accuracy of transferring the pattern of the optical elements can be maintained even if the productivity is increased.

In addition, a portion of the first belt mold S1 around the second rotating roll R2 is cooled by the cooled second rotating roll R2. Therefore, the synthetic resin sheeting A is further cooled around the second rotating roll R2 in the second cooling process, and thus, the synthetic resin sheeting A is prevented from stretching when the synthetic resin sheeting A is stripped from the first belt mold S1. The accuracy of transferring the pattern of the optical elements can therefore be more securely maintained.

Since the pressure roll R3 is heated, the second belt mold S2 is heated by the pressure roll R3 in the apparatus operating process P1. Since the thus heated second belt mold S2 is pressed against the first belt mold S1, the temperature of the first belt mold S1 can be prevented from being unnecessarily lowered. Therefore, the synthetic resin sheeting A can be properly heated.

Since the synthetic resin sheeting is fed onto the surface of the first belt mold S1 via the heated second belt mold S2 in the feeding process, the time taken for the softening process before entering the forming process can be lengthened, and the preset temperature of the rotating roll R1 and the rotating roll R3 can be lowered. As a result, the durability of the second belt mold and the first belt mold can be increased. Since the time for the softening process before entering the forming process can be lengthened, the processing speed can be increased and thus the productivity can be increased.

Since the synthetic sheeting A is laminated with the film B in the laminating process, the surface of the synthetic resin sheeting A can be protected.

(Second Embodiment)

Figure 4:
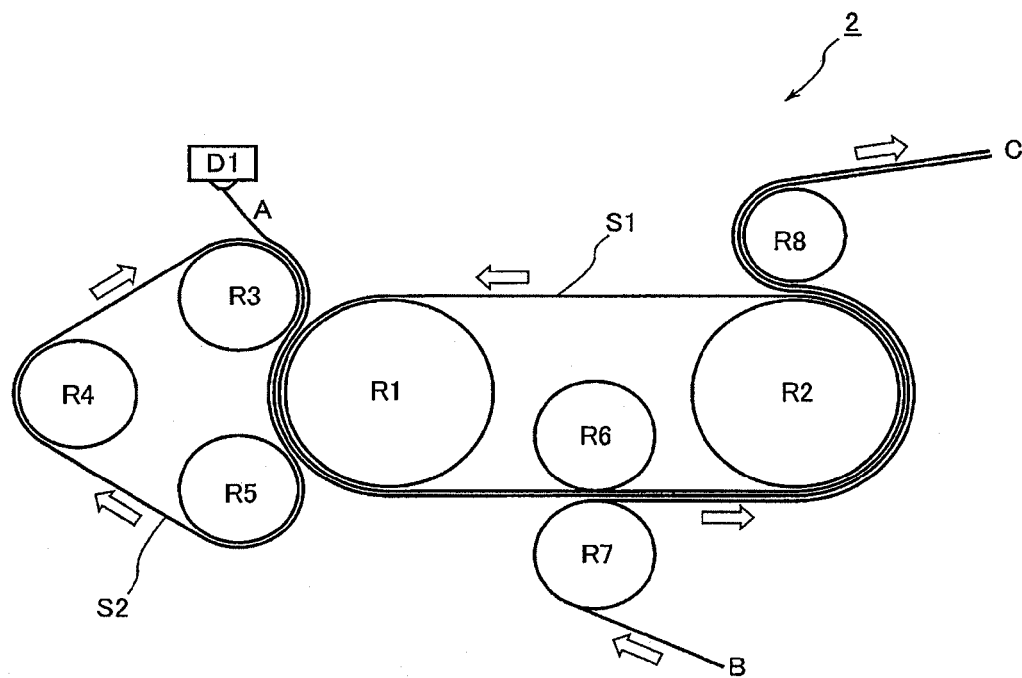
FIG. 4 is a diagram showing an apparatus for producing optical sheeting according to a second embodiment of the invention.

Next, a second embodiment of the invention will be described in detail referring to FIG. 4. Here, components that are identical or similar to those in the first embodiment are indicated by the same reference numerals and the same description will not be repeated. FIG. 4 is a diagram showing an apparatus for producing optical sheeting according to the second embodiment of the invention.

As shown in FIG. 4, the apparatus 2 for producing optical sheeting of this embodiment is different from the apparatus 1 for producing optical sheeting of the first embodiment in that the roll R9 is not provided and that a sheet feeder is an extrusion die D1 configured to extrude softened resin. Synthetic resin sheeting A in a softened state is extruded through the extrusion die D1. The extruded synthetic resin sheeting A is fed onto the surface of the second belt mold S2 at the position where the second belt mold S2 is in contact with the pressure roll R3.

The extrusion die D1 may be a coat hanger type extrusion die attached to a single-screw extruder. A screw not shown is provided in the extrusion die. The screw may have a ratio of the diameter to the length (diameter/length) of $1/20$ to $1/35$, a compression ratio of 1.5 to 4.0, and a rotational speed of 20 to 100 rpm, for example. In addition, a vacuum vent, a gear pump feeder and the like may be used in combination depending on the properties of the synthetic resin. The extrusion die D1 and the second belt mold S2 are preferably close to each other with a spacing therebetween of about 1 to 10 mm in terms of preventing formation of wrinkles and bubbles in the synthetic resin sheeting A.

According to the apparatus 2 for producing optical sheeting and the method for producing optical sheeting according to this embodiment, the resin is fed directly from the extrusion die D1 and the extrusion die D1 is arranged close to the first belt mold S1. Thus, the synthetic resin sheeting A can be fed in a softened state. Therefore, the preset temperature of the rotating roll R1 and the pressure roll R3 can be lowered, and the durability of the second belt mold S2 and the first belt mold S1 can be increased. In addition, since the synthetic resin sheeting A is fed in a softened state, the processing speed can be increased and the productivity can be increased.

(Third Embodiment)

Figure 5:
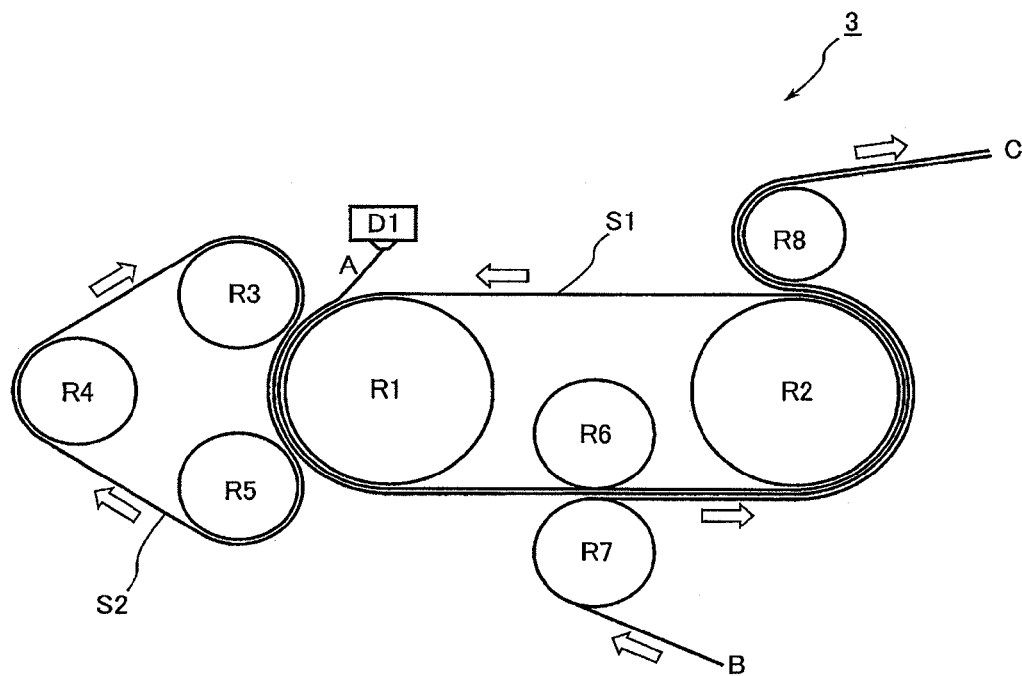
FIG. 5 is a diagram showing an apparatus for producing optical sheeting according to a third embodiment of the invention.

Next, a third embodiment of the invention will be described in detail referring to FIG. 5. Here, components that are identical or similar to those in the second embodiment are indicated by the same reference numerals and the same description will not be repeated. FIG. 5 is a diagram showing an apparatus for producing optical sheeting according to the third embodiment of the invention, and FIG. 6 is a perspective view of the apparatus for producing optical sheeting shown in FIG. 5.

Figure 6:
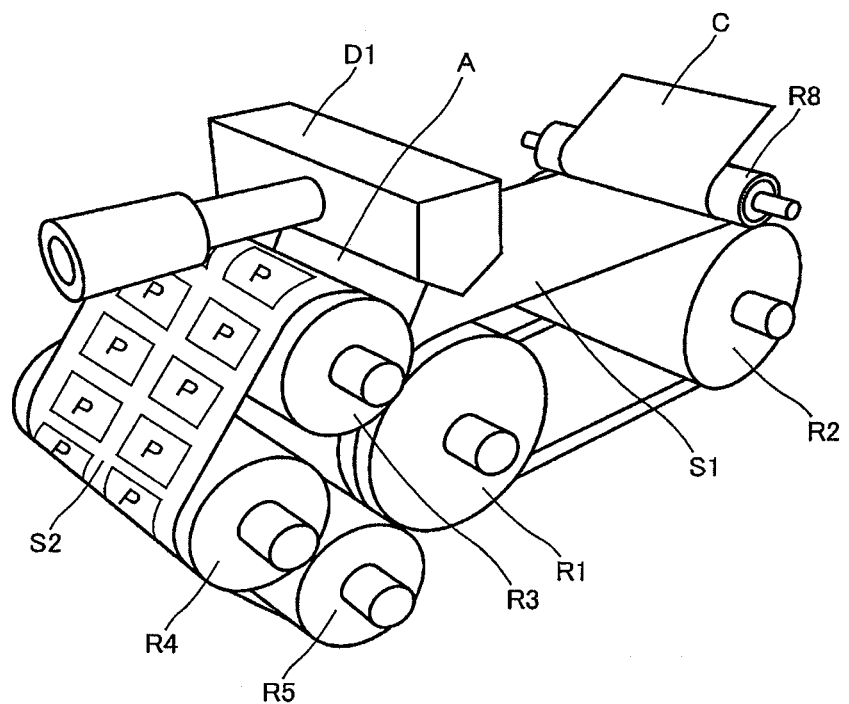
FIG. 6 is a perspective view of the apparatus for producing optical sheeting shown in FIG. 5.

As shown in FIGS. 5 and 6, synthetic resin sheeting A is extruded in a softened state through an extrusion die D1 that is a sheet feeder in the apparatus 3 for producing optical sheeting of this embodiment. The apparatus 3 for producing optical sheeting of this embodiment is different from the apparatus 2 for producing optical sheeting of the second embodiment in that the extruded synthetic resin sheeting A is fed directly onto the surface of the first belt mold S1 at an area where the first belt mold S1 is in contact with the first rotating roll R1. The extrusion die D1 and the first belt mold S1 are preferably close to each other with a spacing therebetween of about 1 to 10 mm in terms of preventing formation of wrinkles and bubbles in the synthetic resin sheeting A also in this embodiment. Regions indicated by P in FIG. 6 are regions where optical elements are to be formed. In this case, when the synthetic resin sheeting A is viewed along a direction perpendicular to the synthetic resin sheeting A, the positions of the regions of the optical elements to be formed on one surface of the synthetic resin sheeting A by means of the first belt mold coincide with the positions of the regions of the optical elements to be formed on the other surface of the synthetic resin sheeting A.

According to the apparatus 3 for producing optical sheeting and the method for producing optical sheeting according to this embodiment, the resin is fed directly onto the first belt mold S1 through the die D1 and the extrusion die D1 is arranged close to the first belt mold S1. Thus, the synthetic resin sheeting A can be fed in a softened state. Therefore, the preset temperature of the rotating roll R1 and the pressure roll R3 can be lowered, and the durability of the second belt mold and the first belt mold can be increased. In addition, since the synthetic resin sheeting A is fed in a softened state, the processing speed can be increased and thus the productivity can be further increased.

(Fourth Embodiment)

Figure 7:
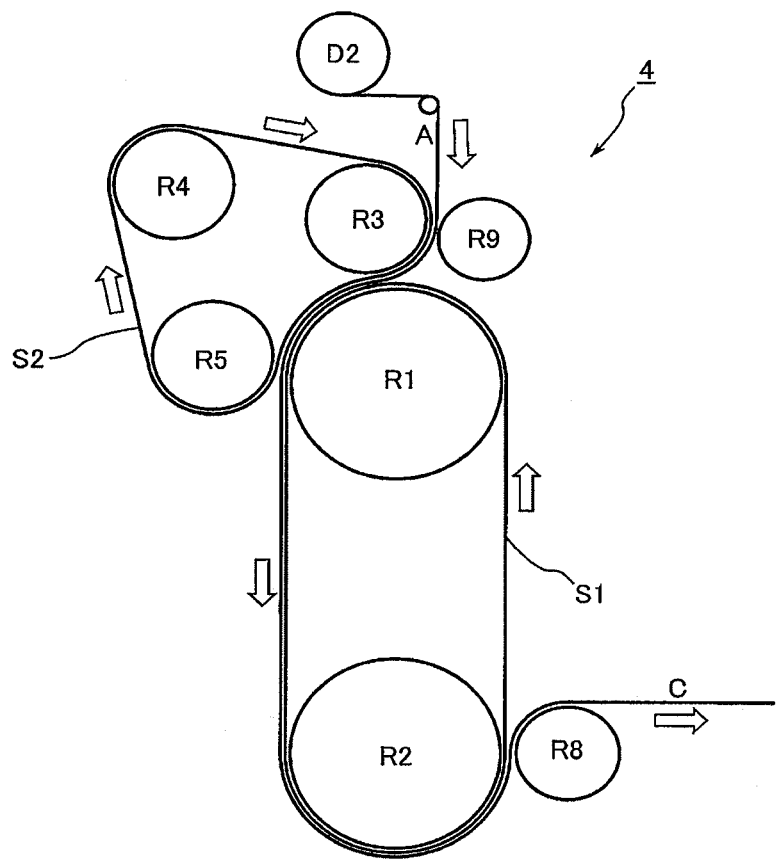
FIG. 7 is a diagram showing an apparatus for producing optical sheeting according to a fourth embodiment of the invention.

Next, a fourth embodiment of the invention will be described in detail referring to FIG. 7. Here, components that are identical or similar to those in the first embodiment are indicated by the same reference numerals and the same description will not be repeated. FIG. 7 is a diagram showing an apparatus for producing optical sheeting according to a fourth embodiment of the invention.

As shown in FIG. 7, the apparatus 4 for producing optical sheeting of this embodiment is different from the apparatus 1 for producing optical sheeting of the first embodiment in that the laminating pressure rolls R6 and R7 as film laminating means are not provided. Therefore, optical sheeting without the film B shown in FIG. 1 is produced according to this embodiment.

In such an apparatus for producing optical sheeting, the surface of the second belt mold S2 facing the first belt mold S1 is preferably a flat surface having a high smoothness that is mirror-finished. With such a configuration, the smoothness of the surface of the optical sheeting C opposite to the side on which optical elements are formed is increased, and the optical sheeting with higher accuracy can be produced.

According to the apparatus for producing optical sheeting of this embodiment, the structure can be simpler since the film laminating means is not provided.

(Fifth Embodiment)

Figure 8:
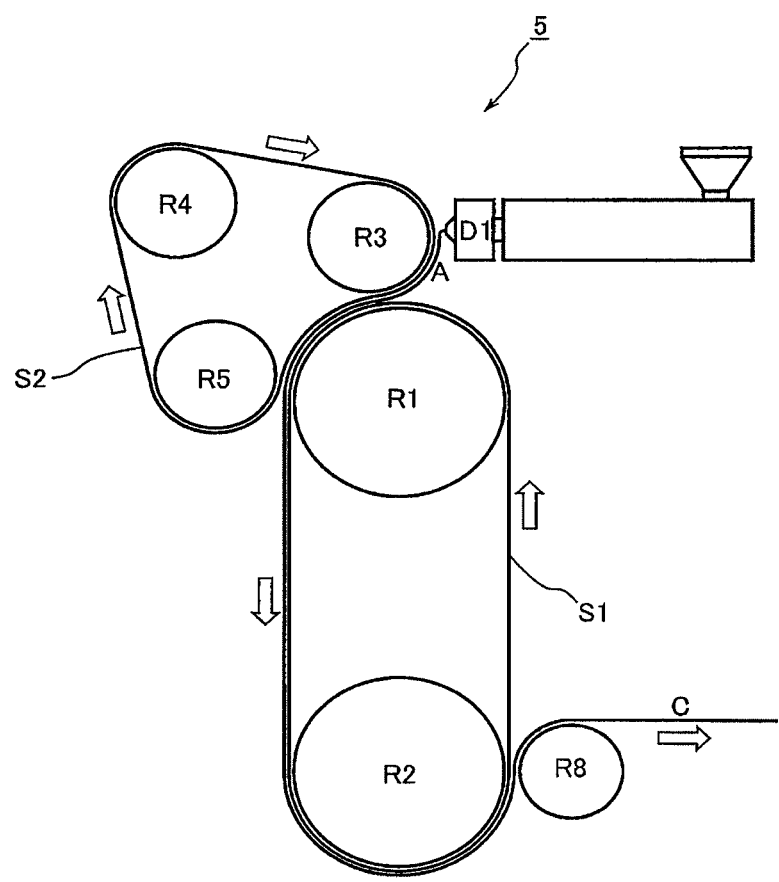
FIG. 8 is a diagram showing an apparatus for producing optical sheeting according to a fifth embodiment of the invention.

Next, a fifth embodiment of the invention will be described in detail referring to FIG. 8. Here, components that are identical or similar to those in the second embodiment are indicated by the same reference numerals and the same description will not be repeated. FIG. 8 is a diagram showing an apparatus for producing optical sheeting according to the fifth embodiment of the invention.

As shown in FIG. 8, the apparatus 5 for producing optical sheeting of this embodiment is different from the apparatus 2 for producing optical sheeting of the second embodiment in that the laminating pressure rolls R6 and R7 as film laminating means are not provided. Therefore, optical sheeting without the film B shown in FIG. 1 is produced according to this embodiment.

The surface of the second belt mold S2 facing the first belt mold S1 is preferably a flat surface having a high smoothness that is mirror-finished also in this embodiment. With such a configuration, the smoothness of the surface of the optical sheeting C opposite to the side on which optical elements are formed is increased, and the optical sheeting with higher accuracy can be produced.

According to the apparatus for producing optical sheeting of this embodiment, the structure can be simpler since the film laminating means is not provided.

(Sixth Embodiment)

Figure 9:
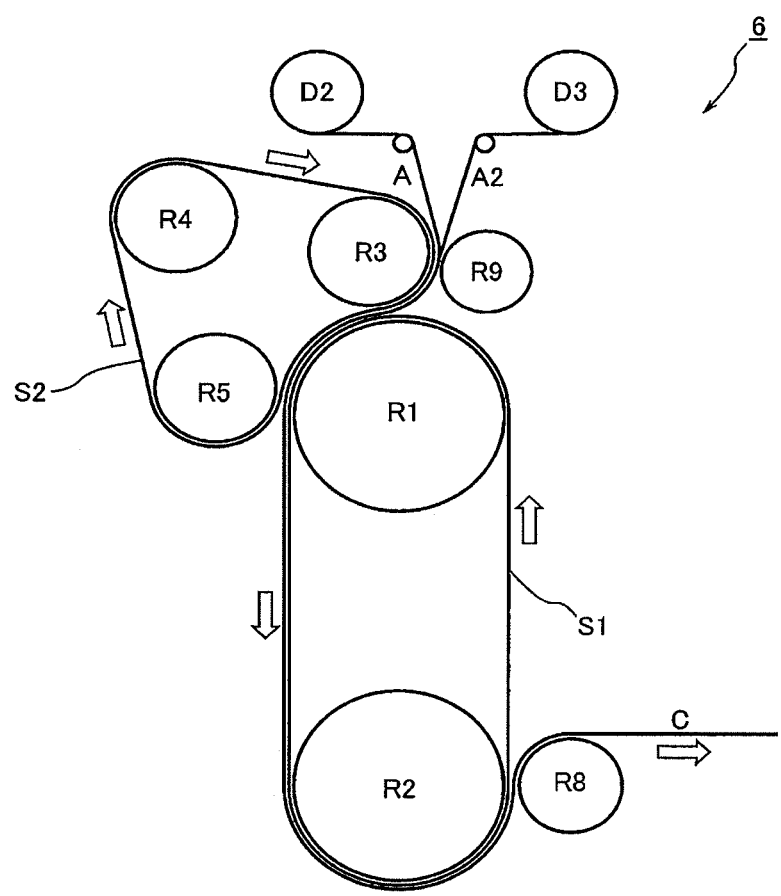
FIG. 9 is a diagram showing an apparatus for producing optical sheeting according to a sixth embodiment of the invention.

Next, a sixth embodiment of the invention will be described in detail referring to FIG. 9. Here, components that are identical or similar to those in the fourth embodiment are indicated by the same reference numerals and the same description will not be repeated. FIG. 9 is a diagram showing an apparatus for producing optical sheeting according to the sixth embodiment of the invention.

As shown in FIG. 9, the apparatus 6 for producing optical sheeting of this embodiment is different from the apparatus 4 for producing optical sheeting of the fourth embodiment in that sheet feeding means is constituted by a plurality of reels D2 and D3.

The reel D2 feeds synthetic resin sheeting A and the reel D3 feeds synthetic resin sheeting A2. The synthetic resin sheeting A is fed onto a surface of the second belt mold S2 and the synthetic resin sheeting A2 is fed onto a surface of the synthetic resin sheeting A opposite to the side facing the second belt mold S2. Then, the sheets of synthetic resin sheeting A and A2 are integrated by being heated by the first belt mold S1 and pressed by the second belt mold S2, the synthetic resin sheeting A2 is pressed in intimate contact with the first belt mold S1, and the optical elements 10 are formed on the surface of the synthetic resin sheeting A2.

The resin for the synthetic resin sheeting A2 is not particularly limited as long as it has high transparency, but the same resin as that for the synthetic resin sheeting A can be used.

According to the apparatus for producing optical sheeting of this embodiment, a laminate of a plurality of sheets of synthetic resin sheeting can be used for the optical sheeting. Thus, by heat-sealing a plurality of synthetic resins firmly, deformation and warpage, which may appear when sheets of synthetic resin sheeting are bonded using an adhesive, can be prevented. Moreover, the thickness of the optical sheeting can be increased.

Although the invention has been described above by reference to the first to sixth embodiments as examples, the invention is not limited thereto.

Figure 10:
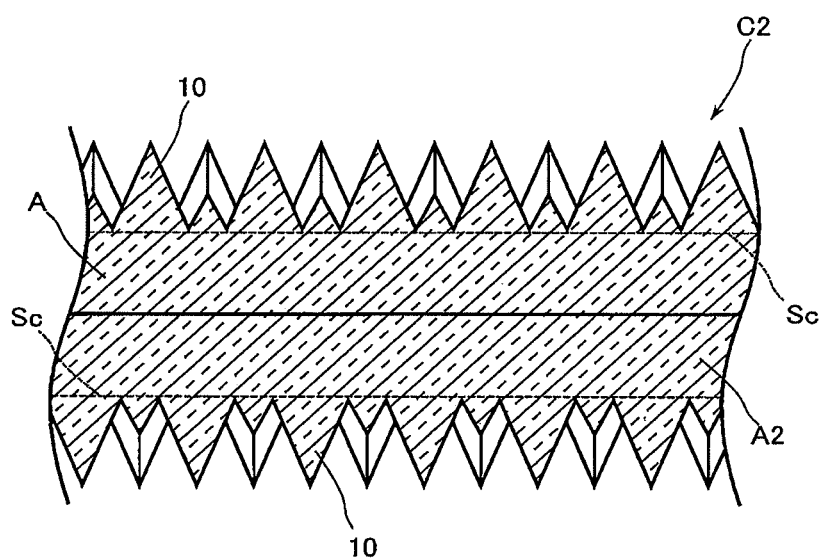
FIG. 10 is a view showing optical sheeting having optical elements formed on both surfaces thereof.
Figure 11:
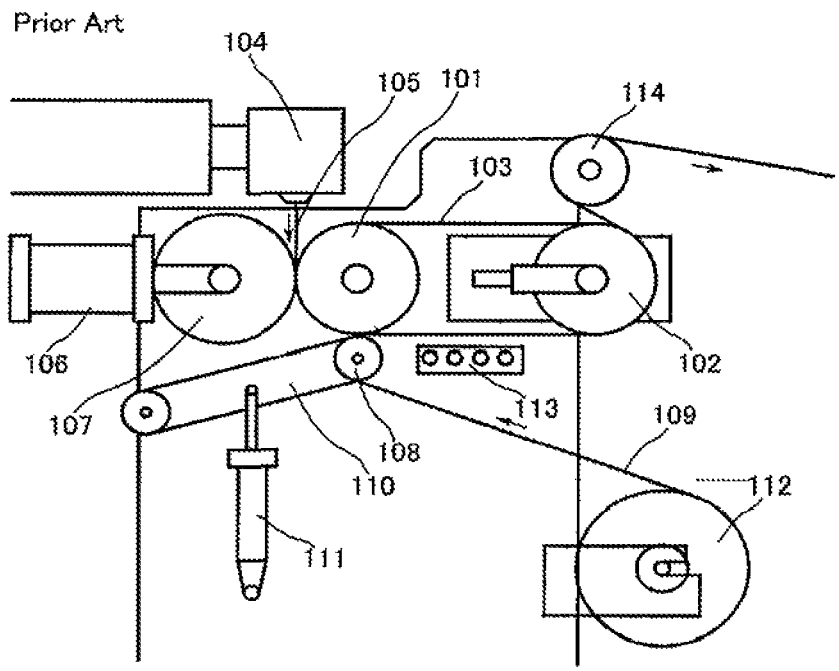
FIG. 11 is a diagram showing a conventional apparatus for producing optical sheeting.
Figure 12:
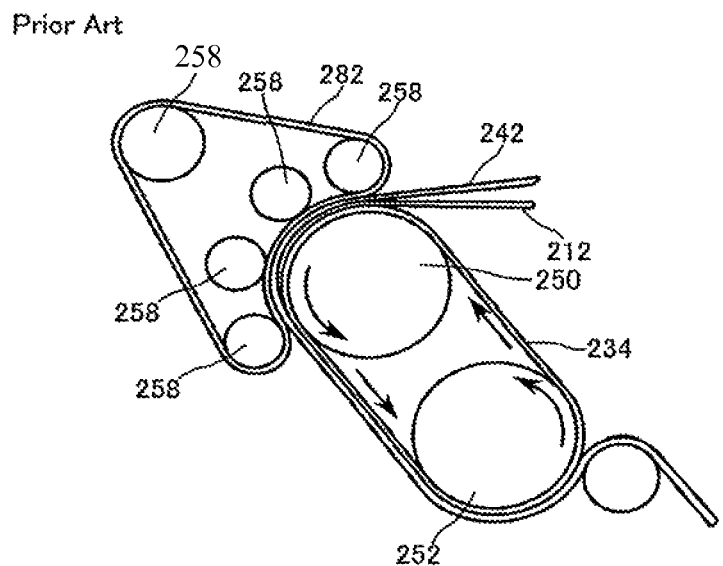
FIG. 12 is a diagram showing a conventional apparatus for producing optical sheeting.

For example, although it has been described that flat molds are formed on the surface facing the first belt mold S1 of the second belt mold S2, the invention is not limited thereto. Molds for optical elements with irregularities may be formed on the surface facing the first belt mold S1 of the second belt mold S2. In this case, optical sheeting having optical elements with irregularities formed on both surfaces thereof can be produced. FIG. 10 is a view showing such optical sheeting having optical elements with irregularities formed on both surfaces thereof. Here, components that are identical to those of the optical sheeting C of FIG. 1 are indicated by the same reference numerals and the same description will not be repeated. As shown in FIG. 10, the optical sheeting C2 is cube corner prism reflective sheeting on which cube corner prisms are arranged. The cube corner prism reflective sheeting as the optical sheeting C2 is formed of synthetic resin sheeting A and synthetic resin sheeting A2. The synthetic resin sheeting A and the synthetic resin sheeting A2 are the same as the synthetic resin sheeting A in the first embodiment, which are made of transparent resin, and a number of optical elements 10 are formed on one surface thereof. Such optical sheeting C2 can be produced by forming molds on the second belt mold S2 in the sixth embodiment. Further, optical elements may be formed on both surfaces of the synthetic resin sheeting A. Such optical sheeting can be produced by forming molds on the second belt mold S2 in the first to fifth embodiments.

In addition, although it has been described that the molds for the optical elements 10 shown in FIG. 1 are formed on the first belt mold S1, the invention is not limited thereto. For example, flat molds may be formed on the surface of the first belt mold S1.

In the first to sixth embodiments, the first belt mold S1 is mounted around the first an second rotating rolls R1 and R2 and turns with the rotation of the first and second rotating rolls R1 and R2. However, the invention is not limited thereto. The apparatus for producing optical sheeting may include a third rotating roll in addition to the first and second rotating rolls R1 and R2 and the first belt mold S1 may be mounted around the third rotating roll as well as the first and second rotating rolls R1 and R2.

The optical sheeting C may be further cooled by an air-cooled cooler after it is laminated with the film B by the laminating pressure rolls R6 and R7 that are film laminating means and before the first belt mold S1 comes in contact with the second rotating roll R2.

Further, printing may be applied on at least one of the synthetic resin sheeting A and the synthetic resin sheeting A2.

Although it has been described that cube corner prisms are formed as the optical elements on the surface of the synthetic resin sheeting A (synthetic resin sheeting A2), the invention is not limited thereto. As the optical elements, linear prisms, lenticular lenses, refractive lenses, Fresnel lenses, linear Fresnel lenses, cross prisms, optical elements for holograms, or planar optical elements may be formed on the surface of the synthetic resin sheeting A (synthetic resin sheeting A2).

If optical elements other than flat optical elements are formed on the surface facing the second belt mold S2 of the synthetic resin sheeting A (synthetic resin sheeting A2), the film B serves as a protective film and thus the synthetic resin sheeting A is laminated with the film B after being cooled.

Still further, although it has been described that the synthetic resin sheeting A (synthetic resin sheeting A2) is fed onto the surface of the second belt mold S2 or on the surface of the first belt mold S1, it may be fed between the second belt mold S2 and the first belt mold S1. Moreover, the synthetic resin sheeting A may be preheated using an indirect heater such as a hot blast heater, a near-infrared lamp heater and a far-infrared lamp heater before being fed.

In the sixth embodiment, two sheets of synthetic resin sheeting A and A2 are fed from two reels D2 and D3. However, at least one of the sheets of synthetic resin sheeting A and A2 may be fed from an extrusion die. Thus, by feeding the sheets of synthetic resin sheeting A and A2 and heat-sealing a plurality of synthetic resins firmly, deformation and warpage, which may appear when the sheets of synthetic resin sheeting are bonded using an adhesive, can be prevented.

In the sixth embodiment, two sheets of synthetic resin sheeting A and A2 are fed together so that the sheets are laid on each other. However, it may be configured such that the synthetic resin sheeting A is fed onto the second belt mold S2 and the synthetic resin sheeting A2 is fed onto the first belt mold S1. By feeding the sheets of synthetic resin sheeting A and A2 in this manner, the respective sheets can be sufficiently preheated, the preset temperature of the rotating roll R1 and the pressure roll R3 can be lowered, and the durability of the second belt mold and the first belt mold can be increased. In addition, since the respective sheets are sufficiently preheated, the processing speed can be increased and thus the productivity can be increased.

Although two sheets of synthetic resin sheeting A and A2 are fed in the sixth embodiment, three or more sheets of synthetic resin sheeting may be laid on one another. In this case, one different resin can be laid between the same resins, for example. In addition, a combination of sheets of synthetic resin sheeting in which resins for some layers have different molecular weights may be used. Alternatively, at least one synthetic resin sheeting may be synthetic resin sheeting to which additives such as an inorganic filler, a colorant, an ultraviolet absorber, an antioxidant and a light stabilizer are added. In this case, the inorganic filler that can be used is not limited, but is preferably particulates of titanium oxide, calcium carbonate, magnesium oxide or the like in terms of improving optical properties such as light transmittance. Alternatively, in this case, another sheet of synthetic resin sheeting having different optical properties from those of the sheets of synthetic resin sheeting A and A2 may be laminated or applied between the synthetic resin sheeting A and the synthetic resin sheeting A2 shown in FIG. 10.

Further, when a plurality of sheets of synthetic resin sheeting A and A2 are laid on one another in the sixth embodiment, an intermediate layer may be laminated or applied in advance on the surface of any one of the sheets of synthetic resin sheeting. Such an intermediate layer is an adhesive layer, a printed layer, a deposited layer, a sputtered layer or the like. The material that can be used for the deposited layer is not particularly limited, but examples thereof include aluminum, gold, silver, copper, palladium, chromium, aluminum, an oxide thereof, a nitride thereof, and a carbide thereof.

EXAMPLES

Hereinafter, the invention will be more concretely described with examples and comparative examples, but the invention is not limited thereto.

First Example

Optical sheeting was produced using the apparatus for producing optical sheeting according to the second embodiment.

First, the first belt mold S1 having a circumferential length of 4,000 mm and a width of 700 mm was mounted around the first and second rotating rolls R1 and R2 each having a diameter of 300 mm and a width of 800 mm shown in FIG. 5. A dielectric heater was arranged inside the first rotating roll R1, and the temperature of the surface of the first rotating roll R1 was raised to 280° C. On the other hand, a water cooler that can lower the internal temperature of the second rotating roll R2 to 20° C. was arranged inside the rotating roll R2. Cavity molds for triangular pyramidal cube corner retroreflective elements and having a prism height of 80 μm and a tilt angle of the optical axis of 8° were formed in a closest packed manner over a width of 600 mm on the surface of the first belt mold S1.

In addition, the second belt mold S2 having a circular shape and a thickness of 0.8 mm and made of steel plated with chromium on the surface thereof was mounted around three pressure rolls R3, R4 and R5 each having a diameter of 200 mm and a width of 800 mm. The surface of the second belt mold S2 opposite to that facing the pressure rolls R3, R4 and R5 was made flat. An oil-circulating heater was arranged inside the pressure roll R3 shown in FIG. 5, and the temperature of the surface of the pressure roll R3 was raised to 260° C. On the other hand, a cooler similar to that of the second rotating roll R2 was arranged inside the pressure roll R5.

A single-screw extruder having a diameter of 50 mm provided with a coat hanger type extrusion die having a width of 650 mm was used as the extrusion die D1.

The laminating pressure rolls R6 and R7 that are film laminating means had surfaces treated with silicone and had a diameter of 200 mm and a width of 700 mm.

In the thus prepared apparatus for producing optical sheeting, the first rotating roll R1 and the second rotating roll R2 were rotated to turn the first belt mold S1 at a high speed of 5 m/min.

Next, synthetic resin sheeting A made of polycarbonate resin (produced by Mitsubishi Engineering-Plastics Corporation) and having a thickness of 180 μm was extruded from the extrusion die D1 onto the first belt mold S1 under a temperature condition of 280° C. Then, the synthetic resin sheeting A was pressed under an applied linear pressure of 75 kg/cm while passing between the second belt mold S2 and the first belt mold S1.

Subsequently, the surface facing the second belt mold S2 of the synthetic resin sheeting was cooled by the pressure roll R5 through the second belt mold S2, and the second belt mold S2 was then stripped from the synthetic resin sheeting A. At this point, the temperature of the synthetic resin sheeting A on the side facing the second belt mold was 190° C.

The temperature of the synthetic resin sheeting A was measured using a non-contact infrared thermometer (manufactured by CHINO Corporation under the trade name of IR-TE). The temperature of the first belt mold S1 was measured using a surface thermometer (manufactured by Anritsu Meter Co., Ltd. under the trade name of HA-200K).

Then, the synthetic resin sheeting A was laminated with an acrylic resin film B (manufactured by Mitsubishi Rayon Co., Ltd.) with a thickness of 50 μm by the laminating pressure rolls R6 and R7. The pressing force applied in this process was 40 kg/cm.

Then, the synthetic resin sheeting A laminated with the acrylic resin film B was cooled by a cooler including nozzles for blowing an air blast at 20° C. and further cooled by the second rotating roll R2 to 50° C. or lower. The synthetic resin sheeting A was then stripped from the second rotating roll R2. The stripping was carried out smoothly. The acrylic resin film was thus laminated and optical sheeting C having a number of triangular pyramidal cube corner retroreflective elements formed on the polycarbonate resin sheeting was obtained.

Next, the appearance of each element on the obtained optical sheeting was observed under a scanning electron microscope at 1000× magnification. As a result, the reflective lateral surfaces of each optical element were very smooth, had no defects in any of apexes and edges, and formed uniformly and sharply.

The retroreflectivity of the obtained optical sheeting at an entrance angle of 5 degrees and an observation angle of 0.2 degrees was measured according to ASTM E810. As a result, the measured retroreflectivity was 1500 cd/(1x·m$^2$), which is an excellent value.

Second Example

Optical sheeting was produced using the apparatus for producing optical sheeting according to the sixth embodiment.

First, the first belt mold S1 having a circumferential length of 4,000 mm and a width of 700 mm was mounted around the first and second rotating rolls R1 and R2 each having a diameter of 300 mm and a width of 800 mm shown in FIG. 9. A dielectric heater was arranged inside the first rotating roll R1, and the temperature of the surface of the first rotating roll R1 was raised to 280° C. On the other hand, a water cooler that can lower the internal temperature of the second rotating roll R2 to 20° C. was arranged inside the rotating roll R2. Cavity molds for cross prisms having a prism height of 10 μm and an apical angle of 90 degrees were formed in a closest packed manner on the surface of the first belt mold S1.

In addition, the second belt mold S2 having a circumferential length of 1,600 mm and a width of 700 mm was mounted around three rolls including the pressure rolls R3 and R5 and the tension roll R4 each having a diameter of 200 mm and a width of 800 mm. Molds for linear prisms having a prism height of 50 μm and an apical angle of 90 degrees were formed in a closest packed manner on the surface facing the first belt mold S1 of the second belt mold S2. An oil circulating heater was arranged inside the pressure roll R3, and the temperature of the surface of the pressure roll R3 was raised to 260° C. On the other hand, a cooler similar to that of the second rotating roll R2 was arranged inside the pressure roll R5.

The laminating pressure roll R9 that are film laminating means had surfaces treated with silicone and had a diameter of 200 mm and a width of 700 mm.

In the thus prepared apparatus for producing optical sheeting, the first rotating roll R1 and the second rotating roll R2 were rotated to turn the first belt mold S1 at a speed of 3 m/min.

Next, polycarbonate resin sheeting A2 (produced by Mitsubishi Engineering-Plastics Corporation) having a thickness of 400 μm from the reel D3 and an acrylic resin sheeting A (produced by Mitsubishi Rayon Co., Ltd.) having a thickness of 75 μm from the reel D2 were fed onto the second belt mold S2. The fed sheets of sheeting A2 and A were pressed by the laminating pressure roll R9, and then pressed in intimate contact for molding under an applied linear pressure of 75 kg/cm while passing between the second belt mold S2 and the first belt mold S1.

The laminated sheets of synthetic resin sheeting A and A2 was then cooled by a cooler including nozzles for blowing an air blast at 20° C. and further cooled by the second rotating roll R2 to 50° C. or lower. The optical sheeting C formed by the laminate of the sheets of synthetic resin sheeting A and A2 was then stripped from the first belt mold S1 by means of the stripping roll R8. The stripping was carried out smoothly. The optical sheeting C having linear prisms formed on the surface of the acrylic resin film and a number of cross prisms formed on the surface of the polycarbonate resin sheeting was thus obtained.

Next, the appearance of each element on both surfaces of the obtained optical sheeting C was observed under a scanning electron microscope at 1000× magnification. As a result, all the reflective lateral surfaces of the linear prisms and the cross prisms were very smooth, had no defects in any of apexes and edges, and formed uniformly and sharply.

As a result of the foregoing, the apparatus for producing optical sheeting and the method for producing optical sheeting according to the invention are found to be capable of increasing productivity while maintaining the accuracy of transferring the pattern of the produced optical elements.

INDUSTRIAL APPLICABILITY

According to the invention, an apparatus for producing optical sheeting and a method for producing optical sheeting with which increased productivity can be achieved while maintaining the accuracy of transferring the pattern of produced optical elements.

DESCRIPTION OF REFERENCE NUMERALS 1, 2, 3, 4, 5, 6 . . . apparatus for producing optical sheeting
A, A2 . . . synthetic resin sheeting
B . . . film
C . . . optical sheeting
D1 . . . extrusion die (sheet feeding means)
D2, D3 . . . reel (sheet feeding means)
P1 . . . apparatus operating process
P2 . . . feeding process
P3 . . . softening process
P4 . . . forming process
P5 cooling process
P6 . . . stripping process
P7 film laminating process
P8 . . . second cooling process
P9 . . . second stripping process
R1 . . . first rotating roll
R2 second rotating roll
R3, R5 . . . pressure roll
R4 . . . tension roll
R6, R7 . . . laminating pressure roll (film laminating means)
R8 . . . stripping roll
R9 . . . roll
S1 . . . first belt mold
S2 . . . second belt mold
Sc . . . common plane
10 . . . optical element

The invention claimed is:

1. An apparatus for producing optical sheeting, comprising:
a first rotating roll configured to be heated;
a second rotating roll;
a first belt mold that has molds for optical elements on a surface thereof, is mounted around the first rotating roll and the second rotating roll, and is configured to turn around the first rotating roll and the second rotating roll with rotation of the first rotating roll and the second rotating roll;
a sheet feeder that feeds synthetic resin sheeting onto a surface of the first belt mold;
a second belt mold that has molds for optical elements on a surface thereof, and is configured to be pressed against the first belt mold at a portion of an area where the first rotating roll and the first belt mold are in contact with each other and to turn with the turning of the first belt mold; and
at least two pressure rolls around which the second belt mold is mounted and which is configured to press the second belt mold against the first belt mold, wherein
one of the pressure rolls is arranged at a position where the second belt mold comes away from the first belt mold and is configured to be cooled at a surface thereof with a cooling medium,
the second belt mold is cooled at a portion where the second belt mold comes away from the first belt mold,
at least one of the pressure rolls other than the pressure roll that is cooled at the surface thereof is heated at a surface thereof,
one of the pressure rolls that are heated at the surface thereof is arranged at a position where the first belt mold and the second belt mold come close to each other, and the second belt mold is heated at least at a portion where the second belt mold comes close to the first belt mold,
wherein at a position where the film is subjected to peeling, one side of the film is heated while the other side of the film is cooled.

2. The apparatus for producing optical sheeting according to claim 1, wherein
a surface of the second rotating roll is cooled, and
the first belt mold is cooled at a portion where the first belt mold is in contact with the second rotating roll.

3. The apparatus for producing optical sheeting according to claim 1 or 2, wherein
the sheet feeder is configured to feed the synthetic resin sheeting onto the surface of the first belt mold through the surface of the second belt mold that is heated by the pressure roll.

4. The apparatus for producing optical sheeting according to claim 1 or 2, wherein
the sheet feeder is configured to feed the synthetic resin sheeting directly onto the surface of the first belt mold at an area where the first belt mold and the first rotating roll are in contact with each other.

5. The apparatus for producing optical sheeting according to claim 4, wherein
the sheet feeder is configured to feed the synthetic resin sheeting in a softened state.

6. The apparatus for producing optical sheeting according to claim 5, wherein
at least two sheets of synthetic resin sheeting are fed from the sheet feeder.

7. The apparatus for producing optical sheeting according to claim 6, wherein
three or more sheets of synthetic resin sheeting are fed from the sheet feeder.

8. The apparatus for producing optical sheeting according to claim 7, wherein
the synthetic resin sheeting between the other sheets of synthetic resin sheeting is sheeting that changes an optical property.

9. The apparatus for producing optical sheeting according to claim 8, further comprising:
a film laminator configured to laminate a surface opposite to a surface facing the first belt mold of the synthetic resin sheeting with a film after the second belt mold comes away from the first belt mold.

10. A method for producing optical sheeting, comprising:
an apparatus operating process of turning a first belt mold having a surface in which molds for optical elements are formed while heating a predetermined area of the turning first belt mold, and turning a second belt mold with the turning of the first belt mold while pressing the second belt mold, which has a surface in which molds for optical elements are formed, against a portion of the predetermined area of the first belt mold and cooling a portion of the second belt mold where the second belt mold comes away from the first belt mold;
a feeding process of feeding synthetic resin sheeting onto a surface of the predetermined area of the first belt mold;
a softening process of softening the synthetic resin sheeting by the heat of the first belt mold;

a forming process of pressing the synthetic resin sheeting in intimate contact with surfaces of the first belt mold and the second belt mold by a pressing force from the second belt mold to form the optical elements on a surface of the synthetic resin sheeting;

a cooling process of cooling at least the surface of the synthetic resin sheeting on the side of the second belt mold, by cooling the second belt mold with a cooling medium in a state where the synthetic resin sheeting on which the optical elements are formed is pressed against the first belt mold; and a stripping process of stripping the cooled synthetic resin sheeting from the second belt mold, wherein in the apparatus operating process, a portion of the second belt mold where the first belt mold and the second belt mold come close to each other is heated and wherein at a position where the film is subjected to peeling, one side of the film is heated while the other side of the film is cooled.

11. The method for producing optical sheeting according to claim 10, wherein in the apparatus operating process, another predetermined area different from the predetermined area of the first belt mold is cooled, and the method further comprises a second cooling process of cooling the synthetic resin sheeting by the cooled first belt mold after the stripping process.

12. The method for producing optical sheeting according to claim 10 or 11, wherein in the feeding process, the synthetic resin sheeting is fed onto the surface of the first belt mold through the heated second belt mold.

13. The method for producing optical sheeting according to claim 10 or 11, wherein in the feeding process, the synthetic resin sheeting is directly fed onto the surface of the predetermined area of the first belt mold.

14. The method for producing optical sheeting according to claim 13, wherein in the feeding process, the synthetic resin sheeting is fed in a softened state.

15. The method for producing optical sheeting according to claim 14, wherein in the feeding process, at least two sheets of the synthetic resin sheeting are fed together so that the sheets are laid on each other.

16. The method for producing optical sheeting according to claim 15, wherein in the feeding process, three or more sheets of the synthetic resin sheeting are fed together so that the sheets are laid on each other.

17. The method for producing optical sheeting according to claim 16, wherein the synthetic resin sheeting between other sheets of synthetic resin sheeting is sheeting that changes an optical property.

18. The method for producing optical sheeting according to claim 17, wherein at least one sheet of the synthetic resin sheeting is made of multilayer synthetic resin.

19. The method for producing optical sheeting according to claim 18, further comprising:

a film laminating process of laminating a surface opposite to a surface facing the first belt mold of the synthetic resin sheeting with a film after the stripping step.

20. The method for producing optical sheeting according to claim 19, wherein the synthetic resin sheeting includes at least one synthetic resin selected from the group consisting of acrylic resin, polyester resin, polycarbonate resin, vinyl chloride resin, polystyrene resin, polyolefin resin, fluorine containing resin, cyclic olefin resin, silicone resin and polyurethane resin.

21. The method for producing optical sheeting according to claim 20, wherein the optical elements are selected from the group consisting of cube corner prisms, linear prisms, lenticular lenses, refractive lenses, Fresnel lenses, linear Fresnel lenses, cross prisms, optical elements for holograms, and planar optical elements.

\* \* \* \* \*

UNITED STATES PATENT AND TRADEMARK OFFICE
CERTIFICATE OF CORRECTION

| | |
|---|---|
| PATENT NO. | : 8,728,360 B2 |
| APPLICATION NO. | : 13/059498 |
| DATED | : May 20, 2014 |
| INVENTOR(S) | : Ikuo Mimura et al. |

It is certified that error appears in the above-identified patent and that said Letters Patent is hereby corrected as shown below:

In the Drawings

SHEET 2:

FIG. 3, "sECOND" should read --SECOND--.

In the Specification

COLUMN 2:

Line 43, "wound" should read --winds--; and
    Line 62, "Synthetic" should read --synthetic--.

COLUMN 3:

Line 20, "and" should read --in order--.

COLUMN 4:

Line 17, "press" should read --presses--;
    Line 57, "are" should read --is--; and
    Line 65, "roll" should read --rolls--.

COLUMN 5:

Line 33, "when" should be deleted; and
    Line 35, "mold," should read --mold;--.

Signed and Sealed this
Thirtieth Day of September, 2014

Michelle K. Lee
*Deputy Director of the United States Patent and Trademark Office*

COLUMN 9:

Line 25, "reflect" should read --reflects--; and
　　Line 38, "fluorine containing" should read --fluorine-containing--.

COLUMN 10:

Line 8, "means" should read --means (--; and
　　Line 9, "shown" should read --shown)--.

COLUMN 13:

Line 9, "rotates." should read --rotate.--.

COLUMN 14:

Line 44, "film laminating" should read --film-laminating--.

COLUMN 16:

Line 30, "screw not shown" should read --screw (not shown)--.

COLUMN 18:

Line 65, "corner prism reflective" should read --corner-prism reflective- --; and
　　Line 66, "corner prism reflective" should read --corner-prism reflective- --.

COLUMN 19:

Line 18, "an" should read --and--.

COLUMN 22:

Line 31, "are" should read --is a--; and
　　Line 49, "was" should read --were--.

COLUMN 23:

Line 24, "P5 cooling process" should read --P5 ... cooling process--;
　　Line 26, "P7 film laminating process" should read --P7 ... film-laminating process--; and
　　Line 30, "R2 second rotating roll" should read --R2 ... second rotating roll--.

CERTIFICATE OF CORRECTION (continued)
U.S. Pat. No. 8,728,360 B2

In the Claims

COLUMN 26:

Line 26, "fluorine con-" should read --fluorine-con- --.